(12) United States Patent
Russell

(10) Patent No.: US 7,232,141 B1
(45) Date of Patent: Jun. 19, 2007

(54) BICYCLE SIDE CHAIR APPARATUS

(76) Inventor: Benjamin Russell, 1670 Dutch Ravine Ct., Reno, NV (US) 89521

( * ) Notice: Subject to any disclaimer, the term of this patent is extended or adjusted under 35 U.S.C. 154(b) by 0 days.

(21) Appl. No.: 11/217,547

(22) Filed: Sep. 2, 2005

(51) Int. Cl.
*B62K 27/00* (2006.01)

(52) U.S. Cl. .................................................. 280/203

(58) Field of Classification Search ................ 280/203
See application file for complete search history.

(56) References Cited

U.S. PATENT DOCUMENTS

| | | | | |
|---|---|---|---|---|
| 592,963 | A | * | 11/1897 | Cretors ........................ 280/203 |
| 608,262 | A | * | 8/1898 | Lord ........................... 280/203 |
| 739,633 | A | * | 9/1903 | Akers ......................... 280/203 |
| 1,133,444 | A | * | 3/1915 | Messier ...................... 280/203 |
| 1,302,476 | A | * | 4/1919 | Simons ...................... 280/203 |
| 1,315,332 | A | * | 9/1919 | Rigby ........................ 280/203 |
| 1,824,675 | A | | 9/1931 | Linn |
| 1,848,451 | A | * | 3/1932 | Wishart ...................... 280/203 |
| 2,485,994 | A | * | 10/1949 | Warner ....................... 280/203 |
| D158,453 | S | | 5/1950 | Glamb |
| 2,537,258 | A | * | 1/1951 | Braun, Jr. ................... 280/203 |
| 2,822,879 | A | * | 2/1958 | Overton ....................... 180/11 |
| 3,013,814 | A | * | 12/1961 | Becks ........................ 280/203 |
| 3,186,732 | A | * | 6/1965 | Mohs ......................... 280/203 |
| 3,704,899 | A | | 12/1972 | Clem, II |
| 4,378,121 | A | | 3/1983 | Rans |
| 5,292,142 | A | | 3/1994 | Vitarelli |
| 5,297,808 | A | | 3/1994 | Ellard |
| 6,311,997 | B1 | * | 11/2001 | Lepley ....................... 280/203 |
| 6,561,532 | B2 | * | 5/2003 | Mixer ........................ 280/203 |
| 6,565,106 | B2 | * | 5/2003 | Lopez ........................ 280/203 |
| 6,830,258 | B2 | * | 12/2004 | Foley ........................ 280/203 |

* cited by examiner

*Primary Examiner*—Lesley D. Morris
*Assistant Examiner*—Marc A. Scharich

(57) ABSTRACT

A bicycle side chair apparatus includes a frame assembly that further includes a base having a front edge, a rear edge, a first side edge and a second side edge. A seat assembly is attached to and extends upwardly from the base. A wheel is rotatably coupled to the base. The wheel is positioned adjacent to the second side edge. A front bracket is attached to the frame assembly and is configured to removably secure the frame assembly to a bicycle frame between a seat and a pair of handlebars of the bicycle. A rear bracket is attached to the frame assembly and is configured to removably secure the frame assembly to the bicycle frame adjacent to a seat of the bicycle.

11 Claims, 7 Drawing Sheets

BICYCLE SIDE CHAIR APPARATUS

BACKGROUND OF THE INVENTION

1. Field of the Invention

The present invention relates to bicycle side seat devices and more particularly pertains to a new bicycle side seat device for attaching to a bicycle for providing a seating area on the side of the bicycle.

2. Description of the Prior Art

The use of bicycle side seat devices is known in the prior art. U.S. Pat. No. 3,704,899 describes a seat having a wheel attached thereto which is attachable to the side of a bicycle. Another type of bicycle side seat device is U.S. Pat. No. 5,292,142 that includes a seat portion and a protective canopy extending over the seat portion. Another bicycle side seat device is found in U.S. Pat. No. 4,378,121.

While these devices fulfill their respective, particular objectives and requirements, the need remains for a device that is easily attachable to a bicycle in such a manner that the device is secured to the bicycle in a stable manner. Additionally, the device should be adapted for holding more than one person so that the device may be used by a parent to transport more than one child. Further, the device should include a plurality of guard to prevent a person from falling forward outwardly of the device and from being injured by a wheel attached to the device.

SUMMARY OF THE INVENTION

The present invention meets the needs presented above by generally comprising a frame assembly that includes a base having a front edge, a rear edge, a first side edge and a second side edge. A seat assembly is attached to and extends upwardly from the base. The seat assembly includes a seat portion and a back portion that is attached to and extends upwardly from the seat portion. The back portion generally extends along the rear edge. The seat portion has a width generally between 4 feet and 6 feet. A wheel is rotatably coupled to the base. The wheel is positioned adjacent to the second side edge. A front bracket is attached to the frame assembly and is configured to removably secure the frame assembly to a bicycle frame between a seat and a pair of handlebars of the bicycle. A rear bracket is attached to the frame assembly and is configured to removably secure the frame assembly to the bicycle frame adjacent to a seat of the bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
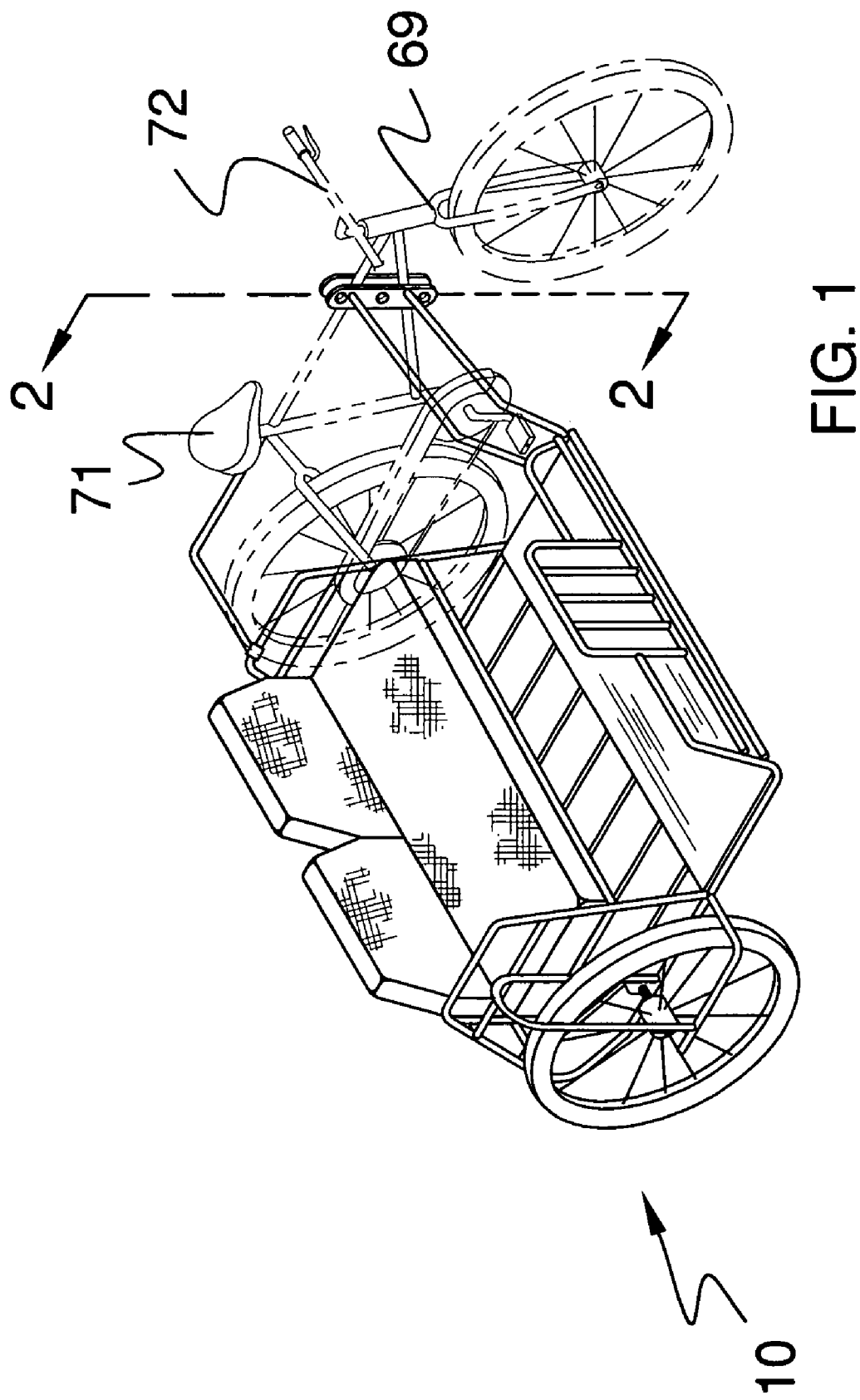
FIG. 1 is a perspective in-use view of a bicycle side chair apparatus according to the present invention.
Figure 3:
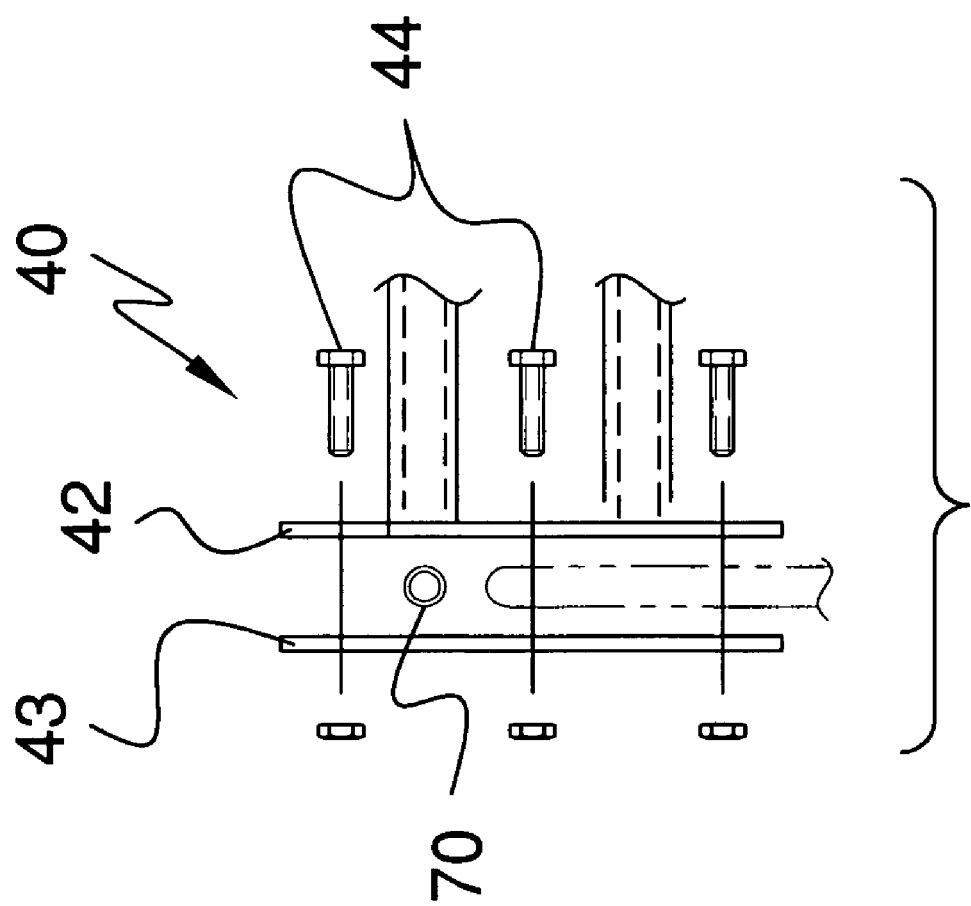
FIG. 3 is an expanded view of a front bracket of the present invention.
Figure 2:
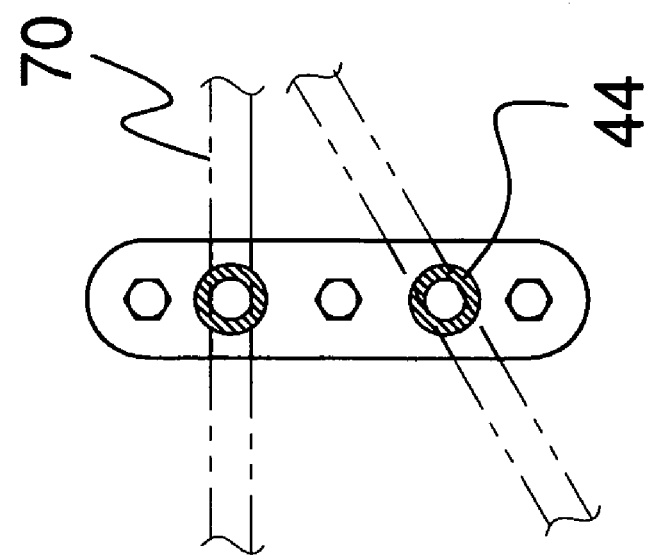
FIG. 2 is a cross-sectional view taken along line 2—2 of FIG. 1 of the present invention.
Figure 5:
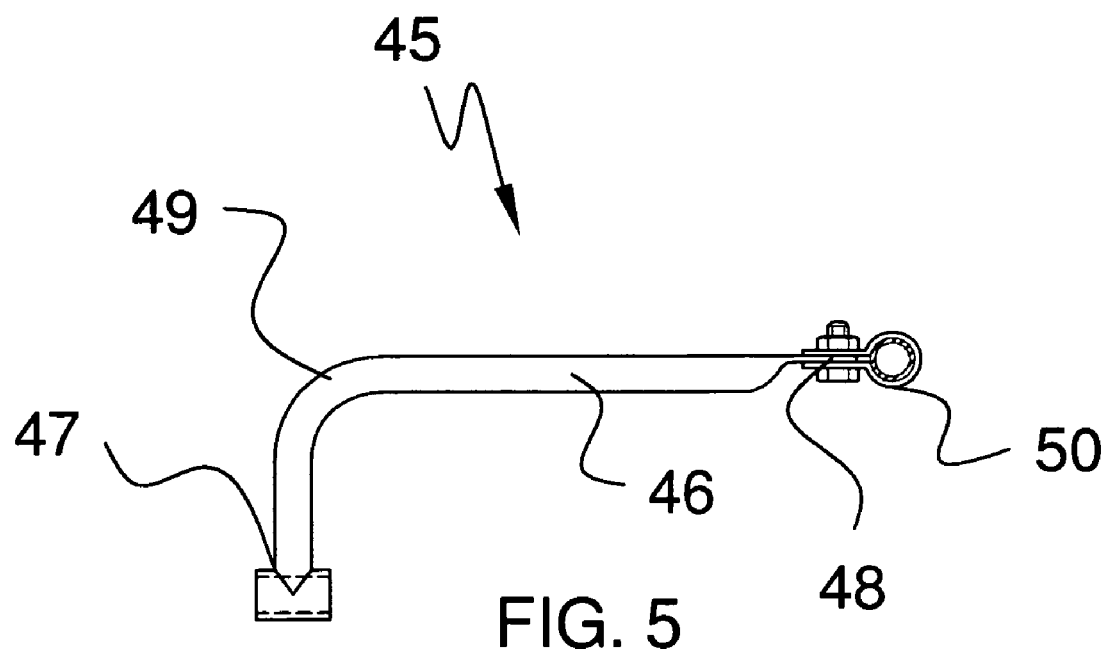
FIG. 5 is a top view of the rear bracket taken along line 5—5 of FIG. 4 of the present invention.
Figure 4:
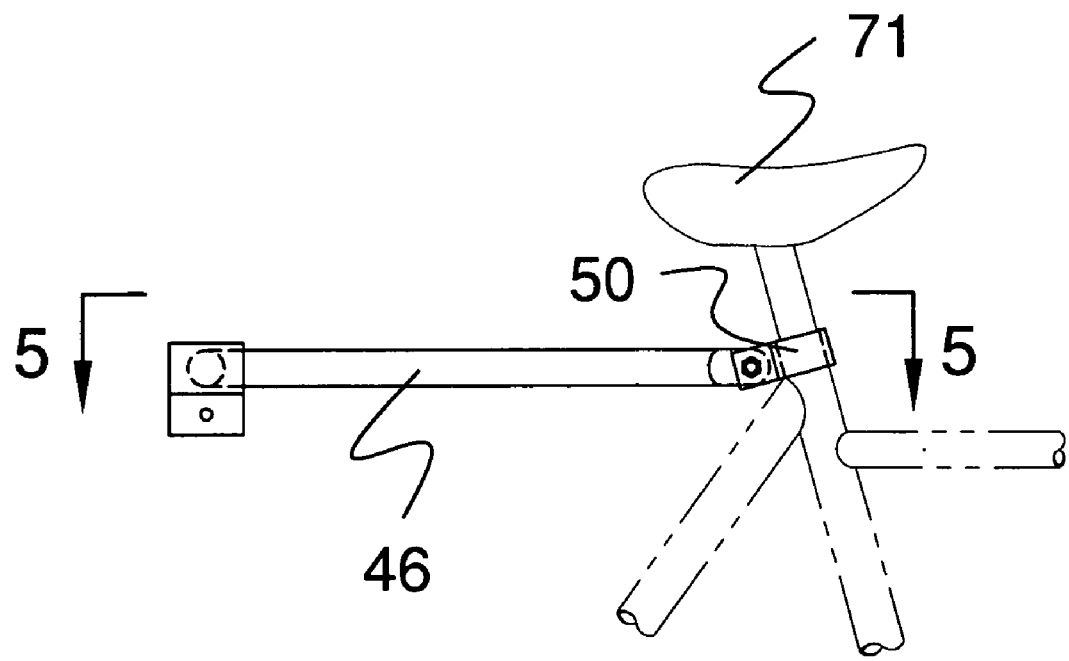
FIG. 4 is a side view of a rear bracket of the present invention.
Figure 6:
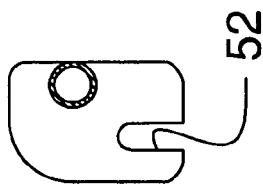
FIG. 6 is a cross-sectional view taken along line 6—6 of FIG. 8 of the present invention.
Figure 7:
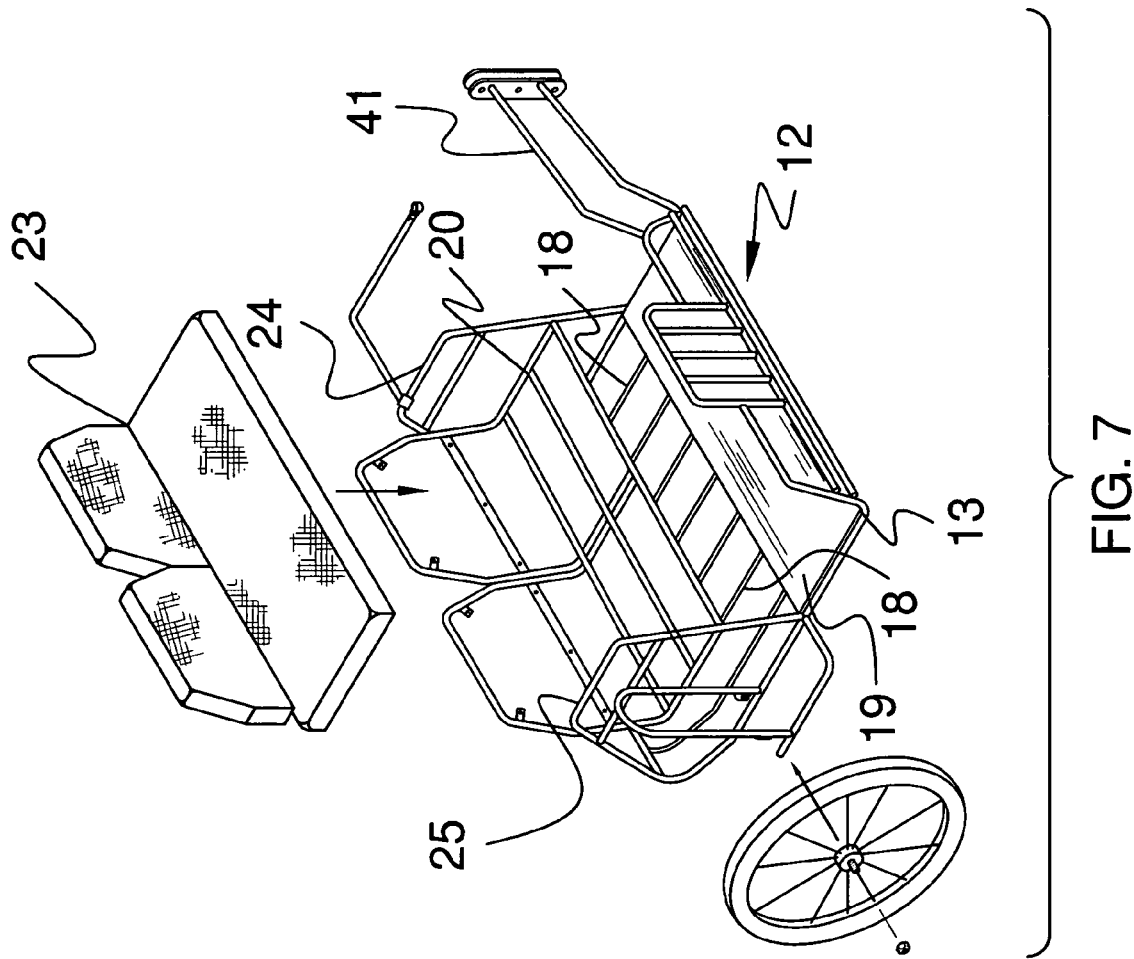
FIG. 7 is a perspective view of the present invention.
Figure 8:
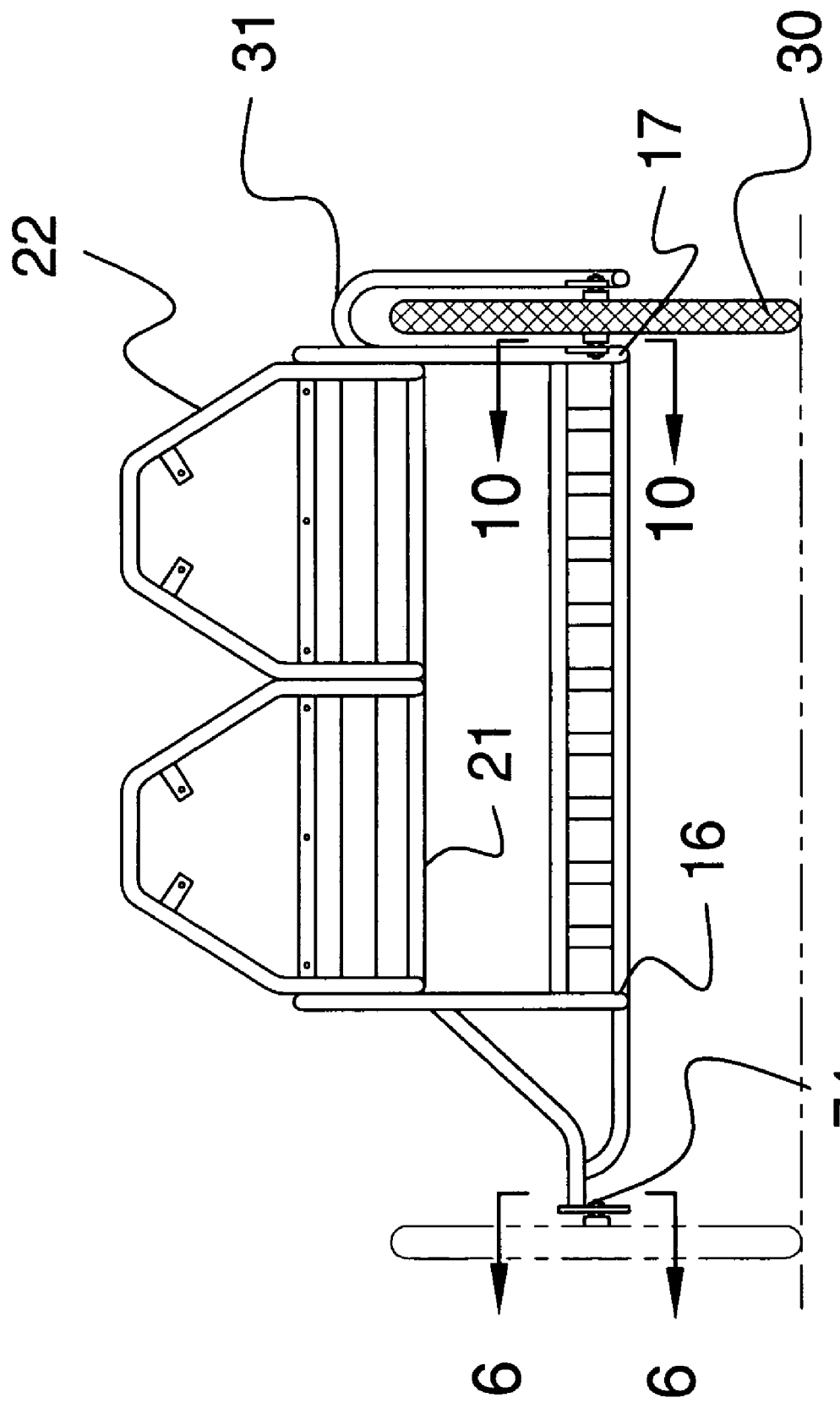
FIG. 8 is a rear view of the present invention.
Figure 9:
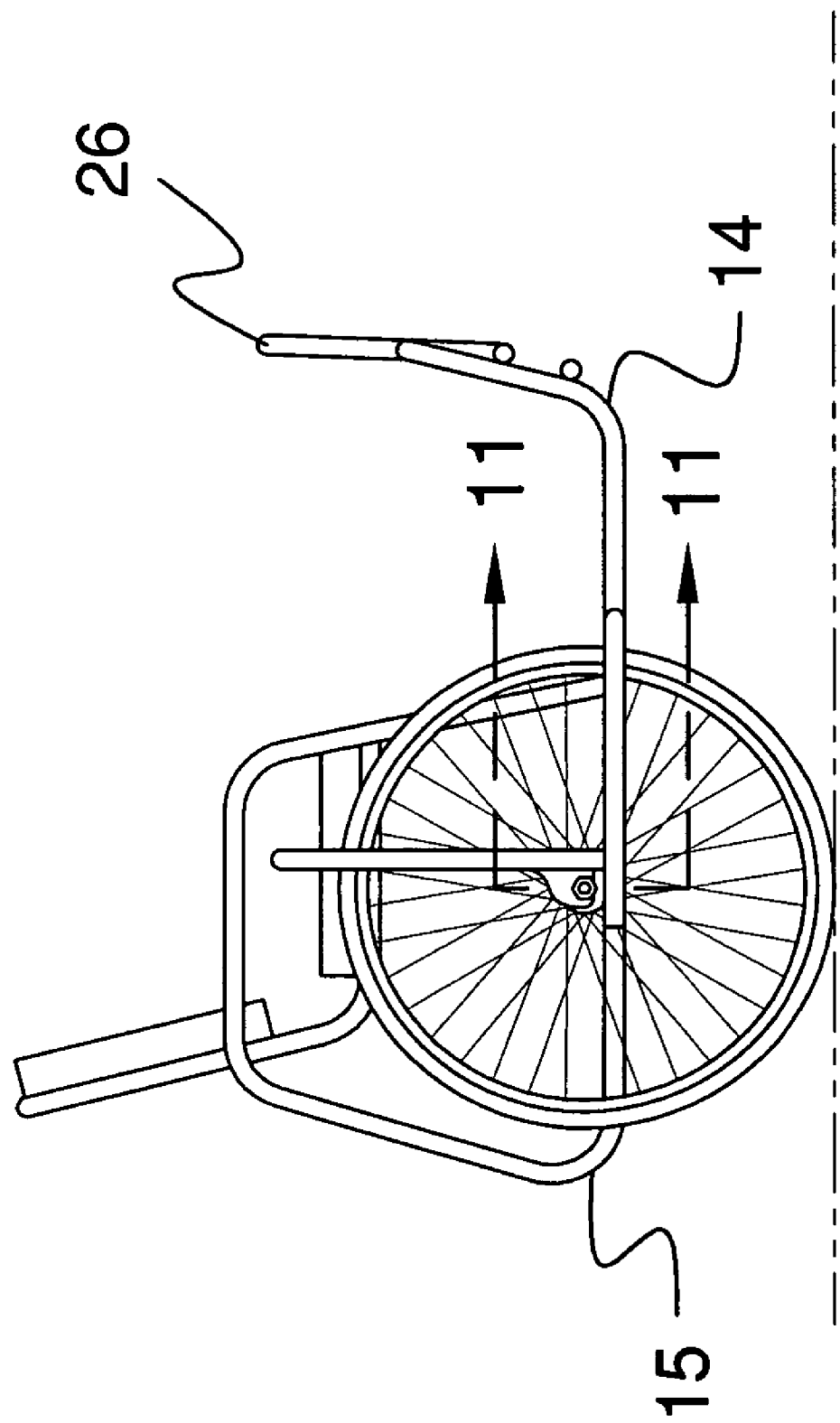
FIG. 9 is a side view of the present invention.
Figure 10:
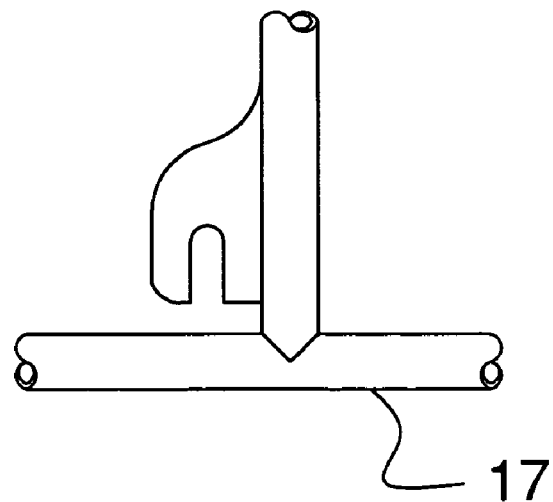
FIG. 10 is a side view taken along line 10—10 of FIG. 8 of the present invention.
Figure 11:
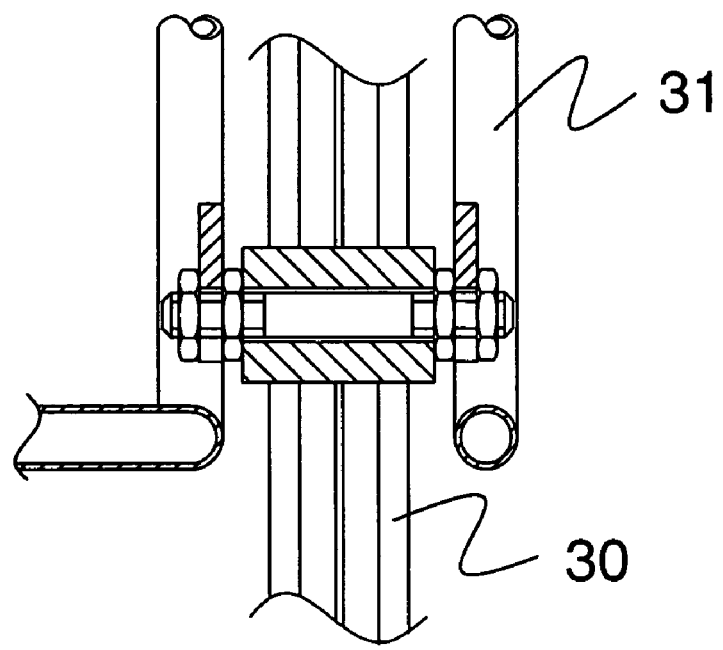
FIG. 11 is a cross-sectional view taken along line 11—11 of FIG. 9 of the present invention.

With reference now to the drawings, and in particular to FIGS. 1 through 11 thereof, a new bicycle side seat device embodying the principles and concepts of the present invention and generally designated by the reference numeral 10 will be described.

As best illustrated in FIGS. 1 through 11, the bicycle side chair apparatus 10 generally comprises a frame assembly 12 that includes a base 13 including a front edge 14, a rear edge 15, a first side edge 16 and a second side edge 17. The base 13 includes a plurality of rigid strips 18 extending between and being attached to the front 14 and rear 15 edges. A perimeter of the base 13 preferably comprises aluminum tubing. A solid panel 19 is positioned on the base 13 and is positioned adjacent to the front edge 14. A seat assembly 20 is attached to and extends upwardly from the base 13. The seat assembly 20 includes a seat portion 21 and a back portion 22 that is attached to and extends upwardly from the seat portion 21. The back portion 22 generally extends along the rear edge 15. The seat portion 21 has a width generally between 4 feet and 6 feet to accommodate two persons. A storage area is defined below the seat portion 21 between the seat portion 21 and the base 13. Cushions 23 are preferably positioned on the seat 21 and back 22 portions. A first side rail 24 is attached to and extends upwardly from the first side edge 16 and a second side rail 25 is attached to and extends upwardly from the second side edge 17. Each of the first 24 and second 25 side rails is positioned adjacent to the rear edge 15. A guardrail 26 is attached to and extends upwardly from the front edge 14 of the base 13 and is angled outwardly from the seat assembly 20. The frame assembly 12 is preferably constructed of aluminum tubing.

A wheel 30 is rotatably coupled to the base 13 and is positioned adjacent to the second side edge 17. The wheel 30 has an axis of rotation that is orientated perpendicular to the second side edge 17. A wheel guard 31 is attached to the second side edge 17 and extends over the wheel 30.

A front bracket 40 is attached to the frame assembly 12 and is configured to removably secure the frame assembly 12 to a bicycle frame 70 between a seat 71 and a pair of handlebars 72 of a bicycle 69. The front bracket 40 includes an arm 41 that is attached to and extends laterally away from the first side edge 16. A first plate 42 is attached to a distal end of the arm 41 with respect to the base 13. A second plate 43 is removably attachable to the first plate 42 with a plurality of fasteners 44. The bicycle frame 70 is positioned between the first 42 and second 43 plates so that the bicycle 69 is attached to the arm 41. The arm 41 may include a pair of arms.

A rear bracket 45 is attached to the frame assembly 12 and is configured to removably secure the frame assembly 12 to the bicycle frame 70 adjacent to a seat 71 of the bicycle 69. The rear bracket 45 includes a rod 46 has a first end 47 and a second end 48. The first end 47 is attached to and extends laterally away from the frame assembly 12. The second end 48 of the rod 46 is removably attachable to the bicycle frame 70 with a clamp member 50. The first end 47 of the rod 46 is positioned on the first side rail 24. The rod 46 has a perpendicular bend 49 therein positioned between the first 47 and second 48 ends and the rod 46 generally lies within a horizontal plane.

An axle engaging clip 50 is attached to the frame assembly 12 and is positioned for receiving an outer end of a rear axle 74 of the bicycle frame 70. The clip 50 provides additional support between the bicycle 69 and the wheel.

In use, the frame assembly 12 is attached to the bicycle 69 as described above. Once attached to the bicycle 69, the seat assembly 20 may be sat upon. The wheel guard 31 prevents people from injuring themselves on the wheel 30 while they are seated in on the seat assembly 20. Once seated, the bicycle 69 is ridden in a conventional manner to transport any persons seated on the seat portion 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle side chair apparatus comprising:
   a frame assembly including;
   a base including a front edge, a rear edge, a first side edge and a second side edge;
   a seat assembly being attached to and extending upwardly from said base, said seat assembly including a seat portion and a back portion being attached to and extending upwardly from said seat portion, said back portion generally extending along said rear edge, said seat portion having a width generally between 4 feet and 6 feet;
   a guard rail being attached to and extending upwardly from said front edge of said base;
   a wheel being rotatably coupled to said base, said wheel being positioned adjacent to said second side edge;
   a front bracket being attached to said frame assembly and being configured to removably secure said frame assembly to a bicycle frame between a seat and a pair of handlebars of the bicycle, said front bracket including a pair of arms, one of said arms being attached to and extending laterally from said first side edge, the other of said arms being attached to and extending laterally away from said guard rail, said arms being vertically spaced from each other, a first plate being attached to a distal end of each of said arms with respect to said base, a second plate being removably attachable to said first plate with a plurality of fasteners, the bicycle frame being positioned between said first and second plates such that the bicycle is attached to the arms; and
   a rear bracket being attached to said frame assembly and being configured to removably secure said frame assembly to the bicycle frame adjacent to the seat of the bicycle.

2. The apparatus according to claim 1, wherein said frame assembly further includes a first side rail being attached to and extending upwardly from said first side edge and a second side rail being attached to and extending upwardly from said second side edge, each of said first and second side rails being positioned adjacent to said rear edge.

3. The apparatus according to claim 1, further including a cushion being positioned on and covering said seat and back portions.

4. The apparatus according to claim 1, further including a wheel guard being attached to said second side edge and extending over said wheel.

5. The apparatus according to claim 1, wherein said rear bracket includes a rod having a first end and a second end, said first end being attached to and extending laterally away from said frame assembly, said second end of said rod being removably attachable to the bicycle frame.

6. The apparatus according to claim 5, wherein said rod has a perpendicular bend therein positioned between said first and second ends, said rod generally lying in a horizontal plane.

7. The apparatus according to claim 5, further including an axle engaging clip being attached to said frame assembly and being positioned for receiving an outer end of a rear axle of the bicycle frame.

8. The apparatus according to claim 1, wherein said rear bracket includes a rod having a first end and a second end, said first end being attached to and extending laterally away from said frame assembly, said second end of said rod being removably attachable to the bicycle frame.

9. The apparatus according to claim 8, wherein said rod has a perpendicular bend therein positioned between said first and second ends, said rod generally lying in a horizontal plane.

10. The apparatus according to claim 1, further including an axle engaging clip being attached to said frame assembly and being positioned for receiving an outer end of a rear axle of the bicycle frame.

11. A bicycle side chair apparatus comprising:
    a frame assembly including;
    a base including a front edge, a rear edge, a first side edge and a second side edge;
    a seat assembly being attached to and extending upwardly from said base, said seat assembly including a seat portion and a back portion being attached to and extending upwardly from said seat portion, said back portion generally extending along said rear edge, said seat portion having a width generally between 4 feet and 6 feet;
    a first side rail being attached to and extending upwardly from said first side edge;
    a second side rail being attached to and extending upwardly from said second side edge, each of said first and second side rails being positioned adjacent to said rear edge;
    a guardrail being attached to and extending upwardly from said front edge of said base;

a cushion being positioned on and covering said seat and back portions;

a wheel being rotatably coupled to said base, said wheel being positioned adjacent to said second side edge;

a wheel guard being attached to said second side edge and extending over said wheel;

a front bracket being attached to said frame assembly and being configured to removably secure said frame assembly to a bicycle frame between a seat and a pair of handlebars of the bicycle, said front bracket including a pair of arms, one of said arms being attached to and extending laterally from said first side edge, the other of said arms being attached to and extending laterally away from said guard rail, said arms being vertically spaced from each other, a first plate being attached to a distal end of each of said arms with respect to said base, a second plate being removably attachable to said first plate with a plurality of fasteners, the bicycle frame being positioned between said first and second plates such that the bicycle is attached to the arms;

a rear bracket being attached to said frame assembly and being configured to removably secure said frame assembly to the bicycle frame adjacent to the seat of the bicycle, said rear bracket including a rod having a first end and a second end, said first end being attached to and extending laterally away from said frame assembly, said second end of said rod being removably attachable to the bicycle frame, said first end of said rod being positioned on said first side rail, said rod having a perpendicular bend therein positioned between said first and second ends, said rod generally lying in a horizontal plane; and an axle engaging clip being attached to said frame assembly and being positioned for receiving an outer end of a rear axle of the bicycle frame.

* * * * *